United States Patent
Chang et al.

(10) Patent No.: US 10,482,616 B2
(45) Date of Patent: Nov. 19, 2019

(54) 3D MODEL RECONSTRUCTION METHOD, ELECTRONIC DEVICE, AND NON-TRANSITORY COMPUTER READABLE STORAGE MEDIUM

(71) Applicant: HTC Corporation, Taoyuan (TW)

(72) Inventors: Jui-Hsuan Chang, Taoyuan (TW); Yu-Cheng Hsu, Taoyuan (TW); Cheng-Yuan Shih, Taoyuan (TW); Sheng-Yen Lo, Taoyuan (TW); Hung-Yi Yang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/943,663

(22) Filed: Apr. 2, 2018

(65) Prior Publication Data

US 2018/0300950 A1 Oct. 18, 2018

Related U.S. Application Data

(60) Provisional application No. 62/486,010, filed on Apr. 17, 2017.

(51) Int. Cl.
*G06T 7/55* (2017.01)
*G06T 17/00* (2006.01)

(52) U.S. Cl.
CPC .............. *G06T 7/55* (2017.01); *G06T 17/00* (2013.01); *G06T 2207/10028* (2013.01)

(58) Field of Classification Search
CPC .... G06T 19/006; G06T 7/50; G06T 7/55–596
See application file for complete search history.

(56) References Cited

U.S. PATENT DOCUMENTS

| 8,260,539 | B2 | 9/2012 | Zeng |
| 2008/0246759 | A1 | 10/2008 | Summers |
| 2015/0035820 | A1* | 2/2015 | Le .................... G06T 17/00 345/419 |

(Continued)

FOREIGN PATENT DOCUMENTS

| TW | 201221902 A | 6/2012 |
| TW | 201516375 A | 5/2015 |
| WO | 2016/014873 A1 | 1/2016 |

OTHER PUBLICATIONS

Sean Buckley. "This Is How Valve's Amazing Lighthouse Tracking Technology Works", Published May 19, 2015; https://gizmodo.com/this-is-how-valve-s-amazing-lighthouse-tracking-technol-1705356768 (Year: 2015).*

(Continued)

*Primary Examiner* — Daniel F Hajnik
(74) *Attorney, Agent, or Firm* — CKC & Partners Co., LLC

(57) ABSTRACT

A 3D model reconstruction method includes: providing, by one or more laser emitters, laser beams; capturing, by a depth camera on an electronic device, a depth data of a target object when that the electronic device moves around the target object; detecting, by one or more light sensors on the electronic device, the laser beams emitted by the one or more laser emitters to obtain a camera pose initial value of the depth camera accordingly; and performing, by a processing circuit, a 3D reconstruction of the target object using the depth data based on the camera pose initial value to output a 3D model of the target object.

17 Claims, 6 Drawing Sheets

(56) References Cited

U.S. PATENT DOCUMENTS

2017/0230641 A1* 8/2017 Scavezze .................. G06T 7/30

OTHER PUBLICATIONS

Waegel KY, "[Poster] A Reconstructive See-Through Display", 2014 IEEE International Symposium on Mixed and Augmented Reality (ISMAR), Sep. 10, 2014, pp. 319-320.
Travis Deyle, "Valve's "Lighthouse" Tracking System May Be Big News for Robotics", Hizook, May 17, 2015, pp. 1-10 (http://www.hizook.com/blog/2015/05/17/valves-lighthouse-tracking-system-may-be-big-news-robotics).
M. Nießner et al., "Combining Inertial Navigation and ICP for Real-time 3D Surface Reconstruction", May 18, 2015. (https://graphics.stanford.edu/~mdfisher/papers/inertialNavigation.pdf).
Richard A. Newcombe et al, "KinectFusion: Real-Time Dense Surface Mapping and Tracking", Mixed and Augmented reality (ISMAR), 2011 10th IEEE International symposium on, Oct. 26, 2011, pp. 127-136.
Corresponding extended European search report dated May 30, 2018.
Corresponding Taiwan office action dated Apr. 8, 2019.

* cited by examiner

3D MODEL RECONSTRUCTION METHOD, ELECTRONIC DEVICE, AND NON-TRANSITORY COMPUTER READABLE STORAGE MEDIUM

RELATED APPLICATIONS

This application claims priority to U.S. Provisional Application Ser. No. 62/486,010, filed Apr. 17, 2017, which is herein incorporated by reference.

BACKGROUND

Technical Field

The present disclosure relates to an electronic device and a 3D model reconstruction method. More particularly, the present disclosure relates to the electronic device and the 3D model reconstruction method related to computer vision.

Description of Related Art

Nowadays, computer vision methods are widely used in various applications. For example, in virtual reality (VR) or augmented reality (AR) application, computer vision methods are used for the VR/AR system to identify objects, real-world environment and/or scenes.

SUMMARY

One aspect of the present disclosure is related to a 3D model reconstruction method. In accordance with some embodiments of the present disclosure, the 3D model reconstruction method includes: providing, by one or more laser emitters, laser beams; capturing, by a depth camera on an electronic device, a depth data of a target object when that the electronic device moves around the target object; detecting, by one or more light sensors on the electronic device, the laser beams emitted by the one or more laser emitters to obtain a camera pose initial value of the depth camera accordingly; and performing, by a processing circuit, a 3D reconstruction of the target object using the depth data based on the camera pose initial value to output a 3D model of the target object.

Another aspect of the present disclosure is related to an electronic device. In accordance with some embodiments of the present disclosure, the electronic device includes a processing circuit, a depth camera electrically connected to the processing circuit, one or more light sensors electrically connected to the processing circuit and arranged on the electronic device, a memory electrically connected to the processing circuit, and one or more programs. The one or more programs are stored in the memory and configured to be executed by the processing circuit. The one or more programs including instructions for: controlling the depth camera to capture a depth data of a target object when the electronic device moves around the target object; obtaining a camera pose initial value of the depth camera based on one or more laser beams detected by the one or more light sensors; and performing a 3D reconstruction of the target object using the depth data based on the camera pose initial value to output a 3D model of the target object.

Another aspect of the present disclosure is related to a non-transitory computer readable storage medium. In accordance with some embodiments of the present disclosure, the non-transitory computer readable storage medium stores one or more programs including instructions, which when executed, causes a processing circuit to perform operations including: controlling a depth camera on an electronic device to capture a depth data of a target object when the electronic device moves around the target object; obtaining a camera pose initial value of the depth camera based on one or more laser beams detected by one or more light sensors on the electronic device; and performing a 3D reconstruction of the target object using the depth data based on the camera pose initial value to output a 3D model of the target object.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
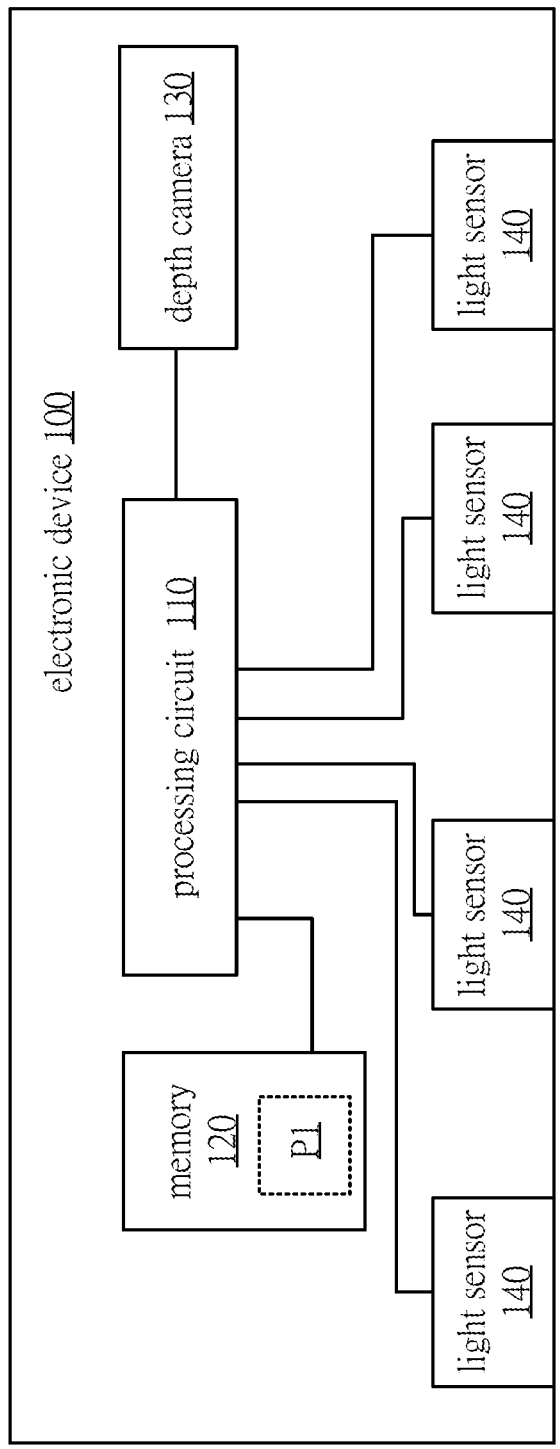
FIG. 1 is a schematic block diagram illustrating an electronic device in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having,"

"contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Reference is made to FIG. 1. FIG. 1 is a schematic block diagram illustrating an electronic device 100 in accordance with some embodiments of the present disclosure. The electronic device 100 may be configured to perform a 3D model reconstruction and environment perception. Specifically, in some embodiments, the electronic device 100 may be applied in a virtual reality (VR)/mixed reality (MR)/augmented reality (AR) system in order to integrate one or more objects in the physical/real-world environment into the virtual environment or virtual objects. The objects in the physical/real-world environment may be first identified by the 3D model reconstruction, such that the integration may be performed based on the identified results.

For example, the electronic device 100 may be realized by, a camera device, a standalone head mounted device (HMD) or VIVE HMD. In detail, the standalone HMD may handle such as processing location data of position and rotation, graph processing or others data calculation.

As shown in FIG. 1, the electronic device 100 includes a processing circuit 110, a memory 120, a depth camera 130, one or more light sensors 140. One or more programs P1 are stored in the memory 120 and configured to be executed by the processing circuit 110, in order to perform the 3D model reconstruction.

In structural, the memory 120 and the depth camera 130 are respectively electrically connected to the processing circuit 110. The light sensor(s) 140 are arranged on the electronic device 100 and electrically connected to the processing circuit 110. The light sensor(s) 140 may be used for a lighthouse tracking system to perform lighthouse tracking in order to detect the position and/or the movement of the electronic device 100. In some embodiments, the light sensor(s) 140 may also be realized by a RGB camera, a RGBD camera, an infrared camera, or another suitable light sensor, but the present disclosure is not limited in this regard.

In some embodiments, the processing circuit 110 can be realized by, for example, one or more processors, such as central processors and/or microprocessors, but are not limited in this regard. In some embodiments, the memory 120 includes one or more memory devices, each of which includes, or a plurality of which collectively include a computer readable storage medium. The computer readable storage medium may include a read-only memory (ROM), a flash memory, a floppy disk, a hard disk, an optical disc, a flash disk, a flash drive, a tape, a database accessible from a network, and/or any storage medium with the same functionality that can be contemplated by persons of ordinary skill in the art to which this disclosure pertains.

Figure 2:
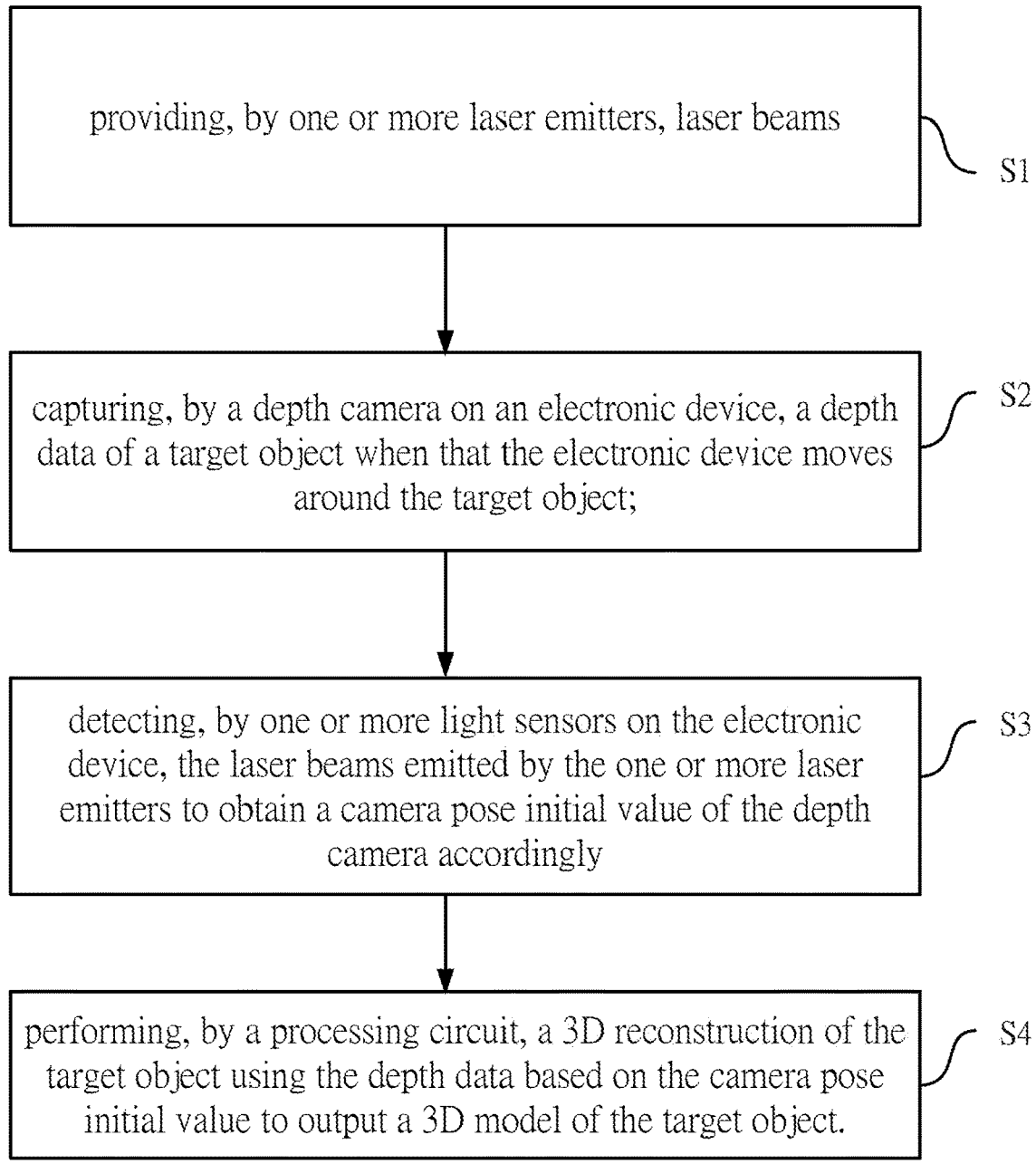
FIG. 2 is a flowchart illustrating a 3D model reconstruction method in accordance with some embodiments of the present disclosure.
Figure 3A:
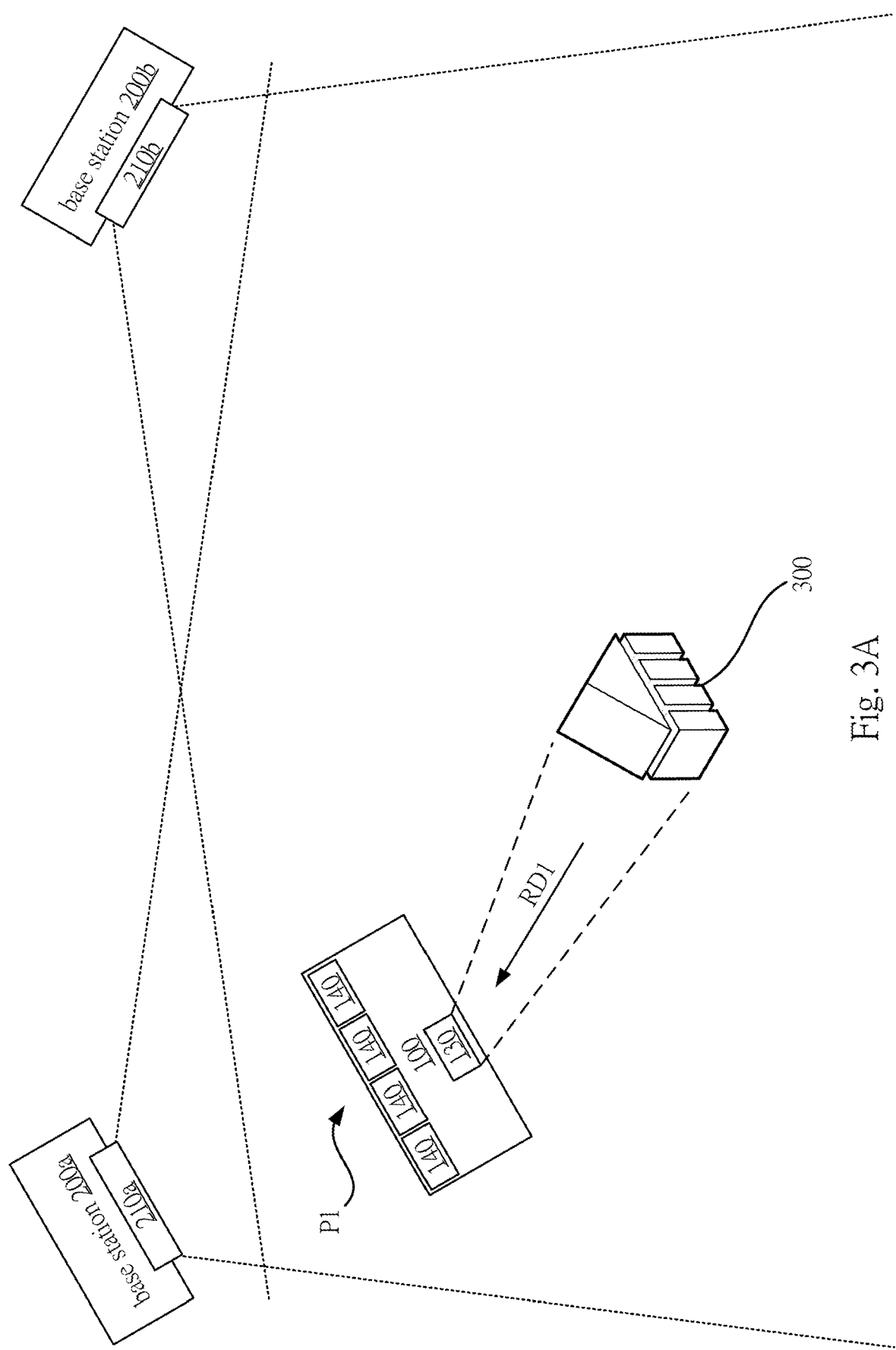
FIG. 3A and FIG. 3B are diagrams illustrating the operation of the electronic device according to some embodiments of the present disclosure.
Figure 3B:
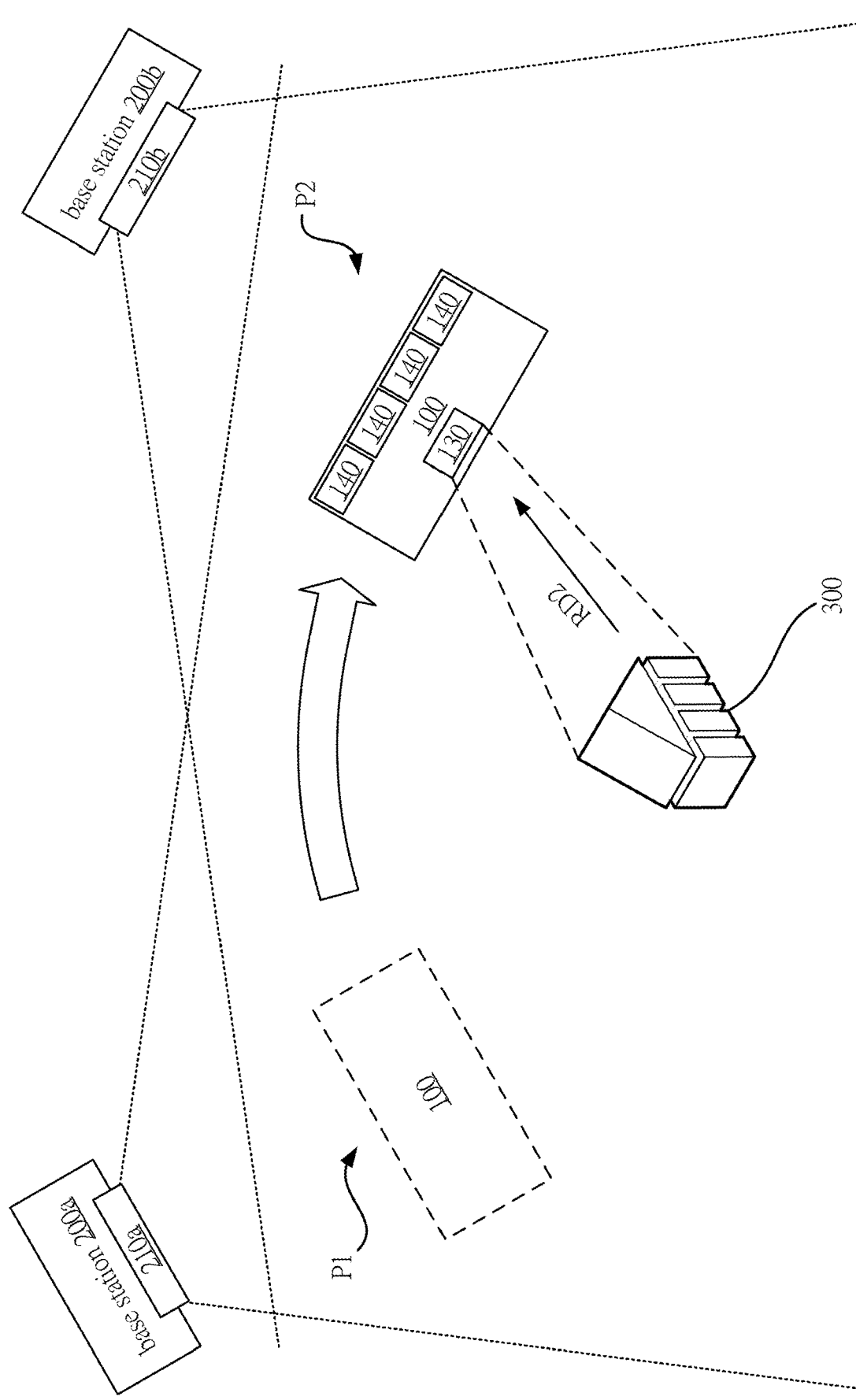

For better understanding of the present disclosure, the detailed operation of the electronic device 100 will be discussed in accompanying with the embodiments shown in FIG. 2, FIG. 3A and FIG. 3B. FIG. 2 is a flowchart illustrating a 3D model reconstruction method 900 in accordance with some embodiments of the present disclosure. FIG. 3A and FIG. 3B are diagrams illustrating the operation of the electronic device 100 at different time points according to some embodiments of the present disclosure. It should be noted that the 3D model reconstruction method 900 can be applied to an electrical device having a structure that is the same as or similar to the structure of the electronic device 100 shown in FIG. 1. To simplify the description below, the embodiments shown in FIG. 1 will be used as an example to describe the 3D model reconstruction method 900 according to some embodiments of the present disclosure. However, the present disclosure is not limited to application to the embodiments shown in FIG. 1.

As shown in FIG. 2, the 3D model reconstruction method 900 includes operations S1, S2, S3, and S4. In operation S1, one or more laser emitters in the lighthouse tracking system are configured to provide multiple laser beams.

As shown in FIGS. 3A and 3B, in some embodiments, the lighthouse tracking system may include laser emitters 210a, 210b arranged in the lighthouse base stations 200a, 200b in the physical/real-world environment. The lighthouse base stations 200a, 200b having laser emitters 210a, 210b are configured to positioning the electronic device 100 and/or detecting orientation, such as tilt angles or rotating angles, of the electronic device 100 with the co-operation of the one or more light sensors 140 and the processing circuit 110.

In operation S2, the processing circuit 110 is configured to control the depth camera 130 arranged on the electronic device 100 to capture a depth data of a target object 300 when that the electronic device 100 moves around the target object 300.

As shown in FIG. 3A and FIG. 3B, in some embodiments, the depth camera 130 moves around the target object 300 and capture the depth raw data in various relative positions of the viewpoints.

For example, in FIG. 3A, at the time point T1, the electronic device 100 and the depth camera 130 are located at the position P1, and the raw depth data RD1 is obtained by the depth camera 130. In FIG. 3B, at the time point T2, the electronic device 100 and the depth camera 130 are located at the position P2, and the raw depth data RD2 is obtained by the depth camera 130.

In operation S3, the one or more light sensors 140 on the electronic device 100 are configured to detect the laser beams emitted by the one or more laser emitters 210a, 210b to obtain a camera pose initial value of the depth camera 130 accordingly. Alternatively stated, the processing circuit 110 may obtain the camera pose initial value of the depth camera 130 based on one or more laser beams detected by the one or more light sensors 140.

Specifically, in the operation S3, a tracker pose of the electronic device 100 may be obtained by the processing circuit 110, according to the laser beams detected by the one or more light sensors 140.

In some embodiments, base stations 200a, 200b may be small rectangular objects placed in the tracking area which serve as reference points for any the tracked electronic device 100, such as the HMDs. Base stations 200a, 200b are configured to constantly flooding the space with a non-visible light by laser emitters 210a and 210b. Thus, the light sensors 140 on the electronic device 100 would intercept the light and figure out where the electronic device 100 is in relation to the base stations 200a, 200b. In some embodiments, multiple base stations 200a, 200b are provided such that the electronic device 100 may figure out its position in the 3D space by the processing circuit 110.

Then, the processing circuit 110 may obtain a corresponding camera pose initial value according to the tracker pose. Alternatively stated, the tracker pose may be transferred from tracker coordinate to camera coordinate by the processing circuit 110, and thus the camera pose initial value may be used for 3D reconstruction.

Next, in operation S4, the processing circuit 110 may be configured to perform the 3D reconstruction of the target object 300 using the depth data based on the camera pose initial value to output a 3D model of the target object 300.

Figure 4:
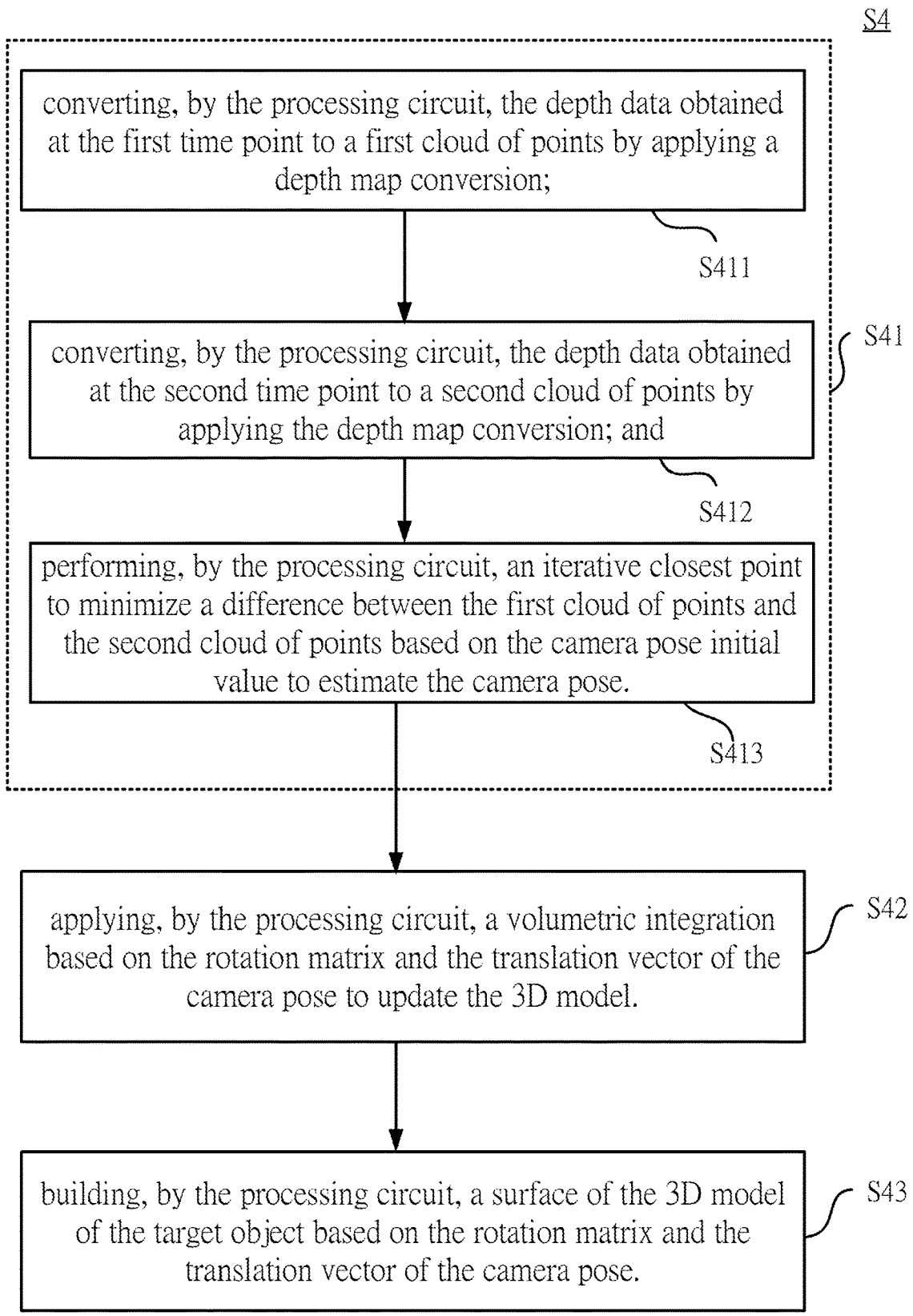
FIG. 4 is a detailed flowchart illustrating the operation in the 3D model reconstruction method according to some embodiments of the present disclosure.

Reference is made to FIG. 4. FIG. 4 is a detailed flowchart illustrating the operation S4 in the 3D model reconstruction method 900 according to some embodiments of the present disclosure.

As shown in FIG. 4, the operation S4 further includes operations S41, S42, and S43. In operation S41, the processing circuit 110 is configured to estimate a camera pose between the time points T1 and T2 based on the depth data RD1 at the time point T1 and the depth data RD2 at the time point T2, and the camera pose initial value.

Specifically, in some embodiments, the operation of estimating the camera pose S41 includes operation S411, S412 and S413. In operation S411, the processing circuit 110 is configured to convert the depth data RD1 obtained at the time point T1 to a cloud of points PC1 by applying a depth map conversion.

In operation S412, the processing circuit 110 is configured to convert the depth data RD2 obtained at the time point T2 to a cloud of points PC2 by applying the depth map conversion.

In operation S413, the processing circuit 110 is configured to perform an iterative closest point (ICP) to minimize a difference between the first cloud of points PC1 and the second cloud of points PC2 based on the camera pose initial value to estimate the camera pose.

Figure 5:
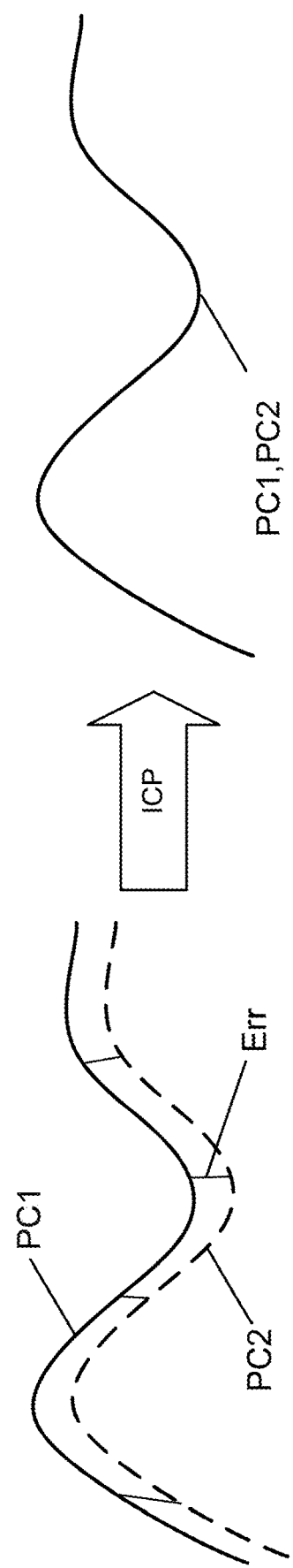
FIG. 5 is a diagram illustrating a process of lighthouse-based Iterative closest point (ICP) in the 3D model reconstruction method according to some embodiments of the present disclosure.

Reference is made to FIG. 5. FIG. 5 is a diagram illustrating a process of lighthouse-based Iterative closest point (ICP) in the 3D model reconstruction method 900 according to some embodiments of the present disclosure.

As shown in FIG. 5, since the tracker pose of the electronic device 100 is obtained from lighthouse tracking system, and then transferred to the camera pose initial value in the camera coordinate for 3D reconstruction, a better initial pose value with lower error value Err may be used for the Iterative closest point (ICP) process to match the cloud of points PC1 and the cloud of points PC2. Thus, the tracking error is not accumulated due to accuracy of lighthouse-based tracking, and the tracking will not be lost on the condition that the lighthouse-based tracking is enabled. In some embodiments, the lighthouse-based tracking system performance may be up to 90 fps. Accordingly, even on the condition that the motion speed of the electronic device 100 and the depth camera 130 located thereon is high, the lighthouse tracking system is able to determine the accurate position of the depth camera 130.

Thus, with an accurate camera pose initial value, after the Iterative closest point (ICP) process in operation S413, the camera pose may be estimated properly.

In some embodiments, the estimated camera pose includes a rotation matrix and a translation vector indicating a movement of the depth camera 130 between the time points T1 and T2. For example, the rotation matrix indicates the rotation of the depth camera 130 between the time points T1 and T2, and the translation vector indicates the translation of the depth camera 130 between the time points T1 and T2.

Next, in the operation S42, the processing circuit is configured to apply a volumetric integration based on the rotation matrix and the translation vector of the camera pose to update the 3D model.

Specifically, in some embodiments, the cloud of points PC2 may be back-projected to the volumetric integration with inverse of the rotation matrix and the translation vector to update the 3D model.

Next, in the operation S43, the processing circuit 110 is configured to build a surface of the 3D model of the target object 300 based on the rotation matrix and the translation vector of the estimated camera pose. For example, the rotation matrix, the translation vector, and the result of ray-casting may be used to build the surface of the 3D model.

It is noted that the above embodiments is simplified for better understanding of the present disclosure. In some embodiments, the operations of the 3D model reconstruction method 900 mentioned above may be performed repeatedly in order to achieve the total 3D model reconstruction. Alternatively stated, the depth camera 130 may obtain more than two sets of depth data at more than two time points, and then the processing circuit 110 may perform the data conversion to obtain multiple clouds of points in order to perform the camera pose estimation between different time points, and build the 3D model and/or surface of the target object 300 accordingly. One skilled in the art can understand how to modify the amounts of the sets of depth data or the frequency of capturing depth data to meet the different requirements, such as the calculation speed and the accuracy/fineness of the 3D model, in various applications with different computation ability of the processing circuit 110.

It should be noted that, in some embodiments, the 3D model reconstruction method 900 may be implemented as a computer program. When the computer program is executed by a computer, an electronic device, or the processing circuit 110 in FIG. 1, this executing device performs the 3D model reconstruction method 900. The computer program can be stored in a non-transitory computer readable storage medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this disclosure pertains.

In addition, it should be noted that in the operations of the abovementioned 3D model reconstruction method 900, no particular sequence is required unless otherwise specified.

Moreover, the operations may also be performed simultaneously or the execution times thereof may at least partially overlap.

Furthermore, the operations of the 3D model reconstruction method 900 may be added to, replaced, and/or eliminated as appropriate, in accordance with various embodiments of the present disclosure.

Through the operations of various embodiments described above, a 3D model reconstruction method is implemented to reconstruction and output a 3D model of the target object for the application in the VR, AR or MR by using lighthouse tracking system in the Iterative Closest Point process.

Since the camera pose initial value is obtained based on the lighthouse tracking system, accuracy and efficiency of the Iterative Closest Point process may be improved. Therefore, the 3D reconstruction process, scene understanding and/or environment perception may be speed-up accordingly, and time consumption for the 3D model reconstruction may be reduced, which brings a smoother user experience when a user interact with the object in the real world in the VR, AR or MR environment.

Various functional components or blocks have been described herein. As will be appreciated by persons skilled in the art, the functional blocks will preferably be implemented through circuits (either dedicated circuits, or general purpose circuits, which operate under the control of one or more processors and coded instructions), which will typically include transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

Although the present disclosure has been described in considerable detail with reference to certain embodiments thereof, other embodiments are possible. Therefore, the scope of the appended claims should not be limited to the description of the embodiments contained herein.

What is claimed is:

1. A 3D model reconstruction method, comprising:
providing, by one or more laser emitters, a plurality of laser beams;
capturing, by a depth camera on an electronic device, a depth data of a target object when that the electronic device moves around the target object;
detecting, by one or more light sensors on the electronic device, the laser beams to obtain a camera pose initial value of the depth camera accordingly; and
performing, by a processing circuit, a 3D reconstruction of the target object using the depth data based on the camera pose initial value to output a 3D model of the target object,
wherein to obtain the camera pose initial value of the depth camera comprises:
obtaining, by the processing circuit, a tracker pose of the electronic device according to the laser beams detected by the one or more light sensors; and
obtaining, by the processing circuit, the camera pose initial value according to the tracker pose,
wherein the tracker pose is transferred from tracker coordinate to camera coordinate to obtain the camera pose initial value of the depth camera.

2. The 3D model reconstruction method of claim 1, further comprising:
estimating, by the processing circuit, a camera pose between a first time point and a second time point based on the depth data at a first time point, the depth data at a second time point, and the camera pose initial value.

3. The 3D model reconstruction method of claim 2, further comprising:
converting, by the processing circuit, the depth data obtained at the first time point to a first cloud of points by applying a depth map conversion;
converting, by the processing circuit, the depth data obtained at the second time point to a second cloud of points by applying the depth map conversion; and
performing, by the processing circuit, an iterative closest point to minimize a difference between the first cloud of points and the second cloud of points based on the camera pose initial value to estimate the camera pose.

4. The 3D model reconstruction method of claim 3, wherein the camera pose comprises a rotation matrix and a translation vector indicating a movement of the depth camera between the first time point and the second time point.

5. The 3D model reconstruction method of claim 4, further comprising:
applying, by the processing circuit, a volumetric integration based on the rotation matrix and the translation vector of the camera pose to update the 3D model.

6. The 3D model reconstruction method of claim 4, further comprising:
building, by the processing circuit, a surface of the 3D model of the target object based on the rotation matrix and the translation vector of the camera pose.

7. An electronic device, comprising:
a processing circuit;
a depth camera electrically connected to the processing circuit;
one or more light sensors electrically connected to the processing circuit and arranged on the electronic device;
a memory electrically connected to the processing circuit; and
one or more programs, wherein the one or more programs are stored in the memory and configured to be executed by the processing circuit, the one or more programs comprising instructions for:
controlling the depth camera to capture a depth data of a target object when the electronic device moves around the target object;
obtaining a camera pose initial value of the depth camera based on one or more laser beams detected by the one or more light sensors; and
performing a 3D reconstruction of the target object using the depth data based on the camera pose initial value to output a 3D model of the target object,
wherein to obtain the camera pose initial value of the depth camera comprises:
receiving a tracker pose of the electronic device from the processing circuit, wherein the tracker pose is obtained according to the one or more laser beams; and
obtaining the camera pose initial value according to the tracker pose,
wherein the tracker pose is transferred from tracker coordinate to camera coordinate to obtain the camera pose initial value of the depth camera.

8. The electronic device as claimed in claim 7, wherein the one or more programs further comprise instructions for:
estimating a camera pose between a first time point and a second time point based on the depth data at a first time point, the depth data at a second time point, and the camera pose initial value.

9. The electronic device as claimed in claim 8, wherein the one or more programs further comprise instructions for:
converting the depth data obtained at the first time point to a first cloud of points by applying a depth map conversion;
converting the depth data obtained at the second time point to a second cloud of points by applying the depth map conversion; and
performing an iterative closest point to minimize a difference between the first cloud of points and the second cloud of points based on the camera pose initial value to estimate the camera pose.

10. The electronic device as claimed in claim 9, wherein the camera pose comprises a rotation matrix and a translation vector indicating a movement of the depth camera between the first time point and the second time point.

11. The electronic device as claimed in claim 10, wherein the one or more programs further comprise instructions for:
applying a volumetric integration based on the rotation matrix and the translation vector of the camera pose to update the 3D model.

12. The electronic device as claimed in claim 10, wherein the one or more programs further comprise instructions for:
building a surface of the 3D model of the target object based on the rotation matrix and the translation vector of the camera pose.

13. A non-transitory computer readable storage medium storing one or more programs, comprising instructions, which when executed, causes a processing circuit to perform operations comprising:
controlling a depth camera on an electronic device to capture a depth data of a target object when the electronic device moves around the target object;
obtaining a camera pose initial value of the depth camera based on one or more laser beams detected by one or more light sensors on the electronic device; and
performing a 3D reconstruction of the target object using the depth data based on the camera pose initial value to output a 3D model of the target object,
wherein to obtain the camera pose initial value of the depth camera comprises:
receiving a tracker pose of the electronic device from the processing circuit, wherein the tracker pose is obtained according to the one or more laser beams detected by the one or more light sensors; and
obtaining the camera pose initial value according to the tracker pose,
wherein the tracker pose is transferred from tracker coordinate to camera coordinate to obtain the camera pose initial value of the depth camera.

14. The non-transitory computer readable storage medium as claimed in claim 13, further comprising instructions, which when executed, causes the processing circuit to further perform operations comprising:
estimating a camera pose between a first time point and a second time point based on the depth data at a first time point, the depth data at a second time point, and the camera pose initial value.

15. The non-transitory computer readable storage medium as claimed in claim 14, further comprising instructions, which when executed, causes the processing circuit to further perform operations comprising:
converting the depth data obtained at the first time point to a first cloud of points by applying a depth map conversion;
converting the depth data obtained at the second time point to a second cloud of points by applying the depth map conversion; and
performing an iterative closest point to minimize a difference between the first cloud of points and the second cloud of points based on the camera pose initial value to estimate the camera pose.

16. The non-transitory computer readable storage medium as claimed in claim 15, further comprising instructions, which when executed, causes the processing circuit to further perform operations comprising:
applying a volumetric integration based on a rotation matrix and a translation vector of the camera pose to update the 3D model.

17. The non-transitory computer readable storage medium as claimed in claim 15, further comprising instructions, which when executed, causes the processing circuit to further perform operations comprising:
building a surface of the 3D model of the target object based on a rotation matrix and a translation vector of the camera pose.

* * * * *